United States Patent
Huang et al.

(10) Patent No.: US 7,796,558 B2
(45) Date of Patent: Sep. 14, 2010

(54) CAPACITY-BASED COMPRESSED MODE CONTROL METHOD FOR INTER-SYSTEM HANDOVER IN UNIVERSAL MOBILE TELECOMMUNICATION SYSTEM

(75) Inventors: Ching Yao Huang, Hsinchu (TW); Cheng Ta Chang, Taipei (TW); Chieh Yuan Ho, Fongshan (TW)

(73) Assignee: National Chiao Tung University, Hsinchu (TW)

( * ) Notice: Subject to any disclaimer, the term of this patent is extended or adjusted under 35 U.S.C. 154(b) by 133 days.

(21) Appl. No.: 11/591,355

(22) Filed: Nov. 1, 2006

(65) Prior Publication Data

US 2007/0258410 A1    Nov. 8, 2007

(30) Foreign Application Priority Data

May 5, 2006    (TW)    ............... 95116032 A

(51) Int. Cl.
*H04W 4/00*    (2009.01)
(52) U.S. Cl. ........................ 370/332; 455/436
(58) Field of Classification Search ................ 370/333, 370/335; 455/560, 436, 439, 410
See application file for complete search history.

(56) References Cited

U.S. PATENT DOCUMENTS

| | | | |
|---|---|---|---|
| 5,212,724 A * | 5/1993 | Nazarenko et al. | 455/560 |
| 6,618,365 B1 * | 9/2003 | Vannatta et al. | 370/333 |
| 6,925,095 B2 | 8/2005 | Pecen et al. | |
| 7,065,340 B1 * | 6/2006 | Einola et al. | 455/410 |
| 2001/0022782 A1 * | 9/2001 | Steudle | 370/335 |
| 2005/0277416 A1 * | 12/2005 | Tolli et al. | 455/436 |
| 2006/0183482 A1 * | 8/2006 | Ueda | 455/439 |

OTHER PUBLICATIONS

Zhang Zhang, "WCDMA compressed mode triggering method for IRAT handover", WCNC 2004 IEEE, vol. 2, Mar. 21-25, 2004.
Wang Ying, Shang Dan, Zhang Ping, Wang Hai, "Comparison between the periodic and event-triggered compressed mode", VTC Spring 2002, IEEE $55^{th}$ vol. 3, May 6-9, 2002.

* cited by examiner

*Primary Examiner*—Rafael Pérez-Gutiérrez
*Assistant Examiner*—Marcos Batista
(74) *Attorney, Agent, or Firm*—Bucknam and Archer

(57) ABSTRACT

The Inter-System handover is one of the key features in the third generation cellular systems. The compressed mode, with variable transmission gaps and power levels, is standardized to support the inter-frequency system handover. To minimize the use of system resources while maintaining the border-cell handover quality, a capacity-based compressed mode control method of the present invention is proposed. Considering the tradeoff between the capacity and the communication quality, the control method can adaptively manage the compressed mode operation based on the potential impacts on the capacity and the effectiveness of the compressed mode measurement. The present invention will improve the effectiveness and performance of the compressed mode operation.

3 Claims, 1 Drawing Sheet

CAPACITY-BASED COMPRESSED MODE CONTROL METHOD FOR INTER-SYSTEM HANDOVER IN UNIVERSAL MOBILE TELECOMMUNICATION SYSTEM

TECHNICAL FIELD

The present invention relates to a capacity-based compressed mode control method for inter-system handover in the Universal Mobile Telecommunication System (UMTS).

BACKGROUND OF THE INVENTION

In order to support more applications and higher transmission speed, the third generation cellular system is now rapidly and broadly developing. For making the Universal Mobile Telecommunication System (UMTS) of global mobile communication system achieving seamless connection, it will normally employ the compressed mode to handle the inter-system handover to the Global System for Mobile Communication (GSM) or the Wireless Local Area Network (WLAN).

In the compressed mode, it will interrupt the current connection, so as to measure the carrier wave of other systems. For the mobile communication in UMTS, it is first required for measuring the strength of carrier wave of other systems between the transmission intervals; then, the mobile communication user could obtain the control channel message from the measurement system based on the associated strength of carrier wave; after completion of collecting the control channel messages, the handover operation will be formally executed.

In order to achieve higher transmission speed and powerless control between transmission intervals, the system must increase the transmission power for the up-link and the down-link, so as to assure the connection quality, however, reduce the capacity on the contrary. Although the compressed mode could help the inter-system handover, some of the system performance will be affected, which is caused by eliminating the power control during the voltage frame.

For example, the U.S. Pat. No. 6,925,095 B2 has disclosed a handover assessment method. But, it did not have enough remaining time and space for dispatching when dealing with more transmission intervals. Moreover, the U.S. Pat. No. 6,618,365 B1 has disclosed a device and method for reducing the up-link, but it only considered the up-link, but not mentioning the down-link. This is the main reason for power consumption.

SUMMARY OF INVENTION

The object of the present invention is to provide a capacity-based compressed mode control method, which could be applied in the inter-system handover in the Universal Mobile Telecommunication System (UMTS), and provide the advantages of reduced power consumption, improved system performance, and keeping system capacity.

The capacity-based compressed mode control method according to the present invention is used in the inter-system handover in UMTS, which includes the following steps: (1) first, determining the priority for each subscriber based on a RF (Radio Frequency) condition, a number measured by the received signal strength indicator (RSSI), and, a continuous-suspend preventing value; (2) next, determining if the subscriber is going to execute a compressed mode or suspending is the compressed mode.

According to a preferred embodiment of the present invention, it further includes: (3) employing a threshold power value to limit the power level of UMTS, and when an estimated transmission power exceeds the threshold power, suspending the compressed mode for each subscriber based on the priority for the subscriber.

Because the present invention employs the priority of the subscriber to determine whether to execute the compressed mode structure, it could keep the system capacity, reduce the power consumption, and improve the system performance.

DETAILED DESCRIPTION OF PREFERRED EMBODIMENTS

The objects, features, advantages and others of the present invention will become more apparent from the following detailed description in which reference is made to some embodiments of the invention and the appended drawings:

The Received Signal Code Power (RSCP) is used for the handover between boundary unit systems and as a tool for triggering measurement. The decay speed of RSCP will approach to be linear, and, with this linear relationship, the RSCP ratio ($R_{RSCP}$) represents the distance required by the compressed mode. The definition of $R_{RSCP}$ could be represented by the formula (1) as follows:

$$R_{RSCP} = \frac{T_{stop} - RSCP}{T_{stop} - T_{ho}} \quad (1)$$

wherein, $T_{stop}$ is the threshold value for stopping the compressed mode; $T_{ho}$ is the threshold value for triggering the handover boundary cell; and, RSCP is the receiving signal encoding power value.

Figure 1:
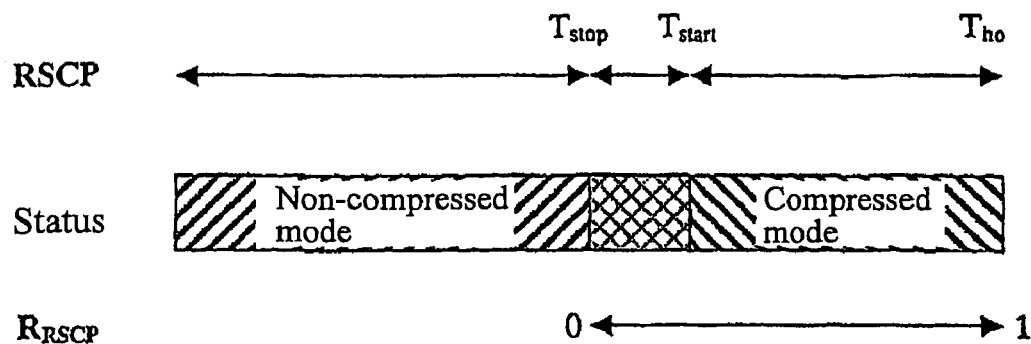
FIG. 1 is a diagram showing the relation of $R_{RSCP}$ and distance in an embodiment according to the present invention.

FIG. 1 is a diagram showing the relation of $R_{RSCP}$ and distance in an embodiment according to the present invention. $R_{RSCP}$ is used to estimate the partially effective distance operated in the compressed mode. When $R_{RSCP}$ is zero, the compressed mode will be stopped; and, when $R_{RSCP}$ is one, it indicates the occurrence of handover to the Global System for Mobile Communication (GSM).

The capacity-based compressed mode control method in an embodiment according to the present invention is used for inter-system handover in UMTS, which employs the compressed mode by suspending the subscriber with lower priority to limit the power level, and when keeping appropriate handover priority, it could assure the capacity. The suspend factor Fi(n) in each frame is defined with the formula (2) as follows:

$$F_i(n) = \frac{N_{meas,i}(n-1)}{R_{RSCP,i}(n)^k} \times R_{suspend,i}(n) \quad (2)$$

wherein, $R_{RSCP}$ is a ratio guiding $R_{RSCP}$; $N_{meas}(n-1)$ is a set of GSM samples after measurement; and, $R_{suspend}$ is a record for the latest compressed mode, in which $R_{suspend}$ is defined with the formula (3) as follows:

$$R_{suspend,i}(n) = \begin{cases} a(\text{suspending record for latest compressed mode}) \\ na(\text{others}) \end{cases}$$

wherein, a is an integer, and n is a positive integer.

Referring to both the formula (2) and formula (3), the control method in an embodiment according to the present invention is preferred to suspend the subscriber near the base station (with smaller $R_{RSCP}$) or suspend the one with larger $N_{meas}$ in GSM carrier wave measurement; in which, the factor in the formula (2) defines the dominant grade for the distance, and the sorting mechanism will enforce each subscriber having the same $N_{meas}/R_{RSCP}^k$, and try to balance the measured set number with the effective distance operated in the compressed mode. When suspending the compressed mode last time, $R_{suspend}$ is "a"; otherwise, $R_{suspend}$ is "na" under other conditions. When the subscriber is just suspended, $R_{suspend}$ will reduce the priority as 1/n, and is designed to prevent a subscriber from being continuously suspended. As well known in the art, the continuous suspending will delay the measurement performance, especially during handing emergent handover. Furthermore, the number of measurement by the RSSI is measured by arranging all subscribers being executed the compressed mode through one base station.

Next, the method will observe the transmission power of the base station, and configure a suspend threshold power $P_{thr}$, and the suspend threshold power $P_{thr}$ is smaller than the maximum transmission power. If the estimation of the transmission power of the base station $P_{BSest}$ does not exceed the suspend threshold power $P_{thr}$, the system will normally operate the compressed mode to assure the measurement performance. If the estimation of the transmission power of the base station $P_{BSest}$ exceeds the suspend threshold power $P_{thr}$, the system will suspend the compressed mode for each subscriber based on the suspend factor $F_{i(+)}$ following the priorities until the transmission power of the base station $P_{BSest}$ is smaller than the suspend threshold power $P_{thr}$, and there is no entrance of subscriber with the new compressed mode.

Figure 2:
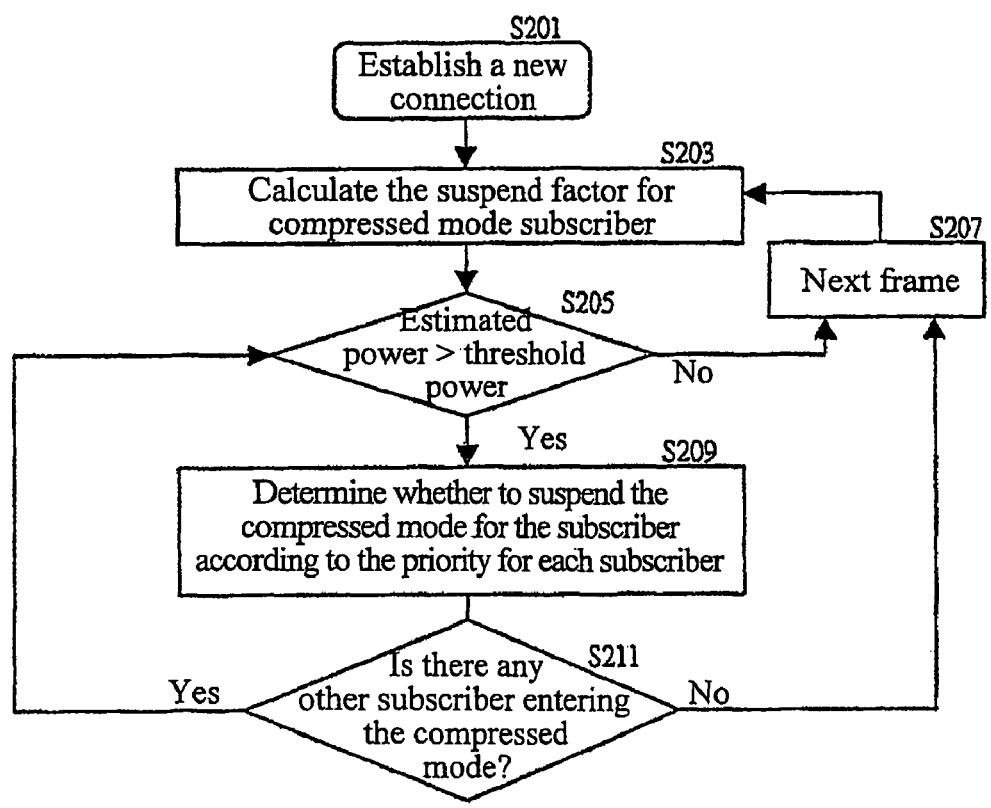
FIG. 2 is a flow chart of the capacity-based compressed mode control method in an embodiment according to the present invention, which could be applied to the inter-system handover in UMTS.

FIG. 2 is a flow chart of the capacity-based compressed mode control method in an embodiment according to the present invention, wherein these steps are represented in numbers: in step S201, establishing a new connection; in step S203, calculating the suspend factor for the compressed mode subscriber; in step S205, indicating if the transmission power of the base station is not larger than the suspend threshold power, in step S207, entering the next frame; if, in step S205, the estimation of the transmission power of the base station is larger than the suspend threshold power, entering the step S209, in which a determination whether to suspend the compressed mode for the subscriber according to the priority for each subscriber is made; next, in step S211, if there is other subscriber entering the compressed mode, returning to the step S205; if there is no subscriber entering the compressed mode, entering the step S207 for the next frame; if entering the step S207, returning to the step S203 for re-calculating the suspend factor for each subscriber.

In summary, because the present invention employs the RF conditions, the receiving strength, and the prevention of continuous suspension to determine the priority, and suspend the structure of the compressed mode based on the priority, it could reduce the power consumption, and improve the system performance.

EXPLANATION OF MAIN COMPONENTS

S201~S209 step

We claim:

1. A capacity-based compressed mode control method for use in a Universal Mobile Telecommunication System (UMTS), which includes the following steps:
   (1) determining a priority for each subscriber, which is determined by a RF (Radio Frequency) condition, a number measured by a Received Signal Strength Indicator (RSSI), and a record value for the latest compressed mode;
   (2) determining if a subscriber is going to execute a compressed mode or suspend the compressed mode, which is determined according to the priority for each subscriber; and
   (3) employing a threshold power value to limit a power level of UMTS, and when an estimated transmission power exceeds the threshold power, suspending the compressed mode for each subscriber according to the priority of each subscriber, wherein said control method is used in inter-system handover between the Universal Mobile Telecommunication System (UMTS) and a Global System for Mobile Communications (GSM), wherein, in the step (1), the priority for each subscriber is decided according to a suspend factor Fi(n) of the subscriber, and the Fi(n) is defined with the formula (2):

$$F_i(n) = \frac{N_{meas,i}(n-1)}{R_{RSCP,i}(n)^k} \times R_{suspend,i}(n) \qquad (2)$$

wherein, $R_{RSCP}$ is a ratio guiding $R_{RSCP}$ (Received Signal Code Power), $N_{meas}(n-1)$ is a set of GSM (Global System for Mobile Communications) samples after measurement, and $R_{suspend}$ is a record for the latest compressed mode; in which $R_{suspend}$ is defined with the formula (3):

$$R_{suspend,i}(n) = \begin{cases} a(\text{suspending record for latest compressed mode}) \\ na(\text{others}) \end{cases}$$

wherein, a is an integer, and n is a positive integer.

2. A control method according to claim 1, wherein the definition of the guide Receiving Signal Code Power $R_{RSCP}$ is defined with the formula (1):

$$R_{RSCP} = \frac{T_{stop} - RSCP}{T_{stop} - T_{ho}} \qquad (1)$$

wherein, $T_{stop}$ is the threshold value for stopping the compressed mode, $T_{ho}$ is the threshold value for triggering the handover boundary cell and RSCP is the receiving signal encoding power value.

3. A control method according to claim 1, wherein the number measured by RSSI is measured when a base station arranges all the subscribers executing the compressed mode.

* * * * *